United States Patent [19]

Palmer et al.

[11] 4,315,265
[45] Feb. 9, 1982

[54] RIGID COLLAPSIBLE DISH STRUCTURE

[75] Inventors: William B. Palmer, Palos Verdes Estates; Martin M. Giebler, Redondo Beach, both of Calif.

[73] Assignee: TRW Inc., Cleveland, Ohio

[21] Appl. No.: 158,412

[22] Filed: Jun. 11, 1980

[51] Int. Cl.³ .......................................... H01Q 15/20
[52] U.S. Cl. ..................................... 343/840; 343/915
[58] Field of Search ............... 343/840, 915, 913, 914

[56] References Cited

U.S. PATENT DOCUMENTS 3,699,576 10/1972 Hoyer ................................. 343/915
3,717,879 2/1973 Canssle ............................... 343/915

*Primary Examiner*—Eli Lieberman

*Attorney, Agent, or Firm*—Robert W. Keller; James W. Paul

[57] ABSTRACT

A collapsible dish structure composed of a plurality of rows of rigid radial petal assemblies concentric with the axis of the dish. The petal assemblies consist of a center petal and two side petals, the center petal hinged on an axis tangent to a circle concentric with the axis of the dish and the side petals hinged to the center petal at their mating edge. The center petal is foldable inwardly and the side petals rotate about their hinges such that the collapsed dish structure occupies a much smaller volume than the deployed dish. Means of controlling the shape of the dish to compensate for differential expansion of the deployed dish are also provided.

13 Claims, 13 Drawing Figures

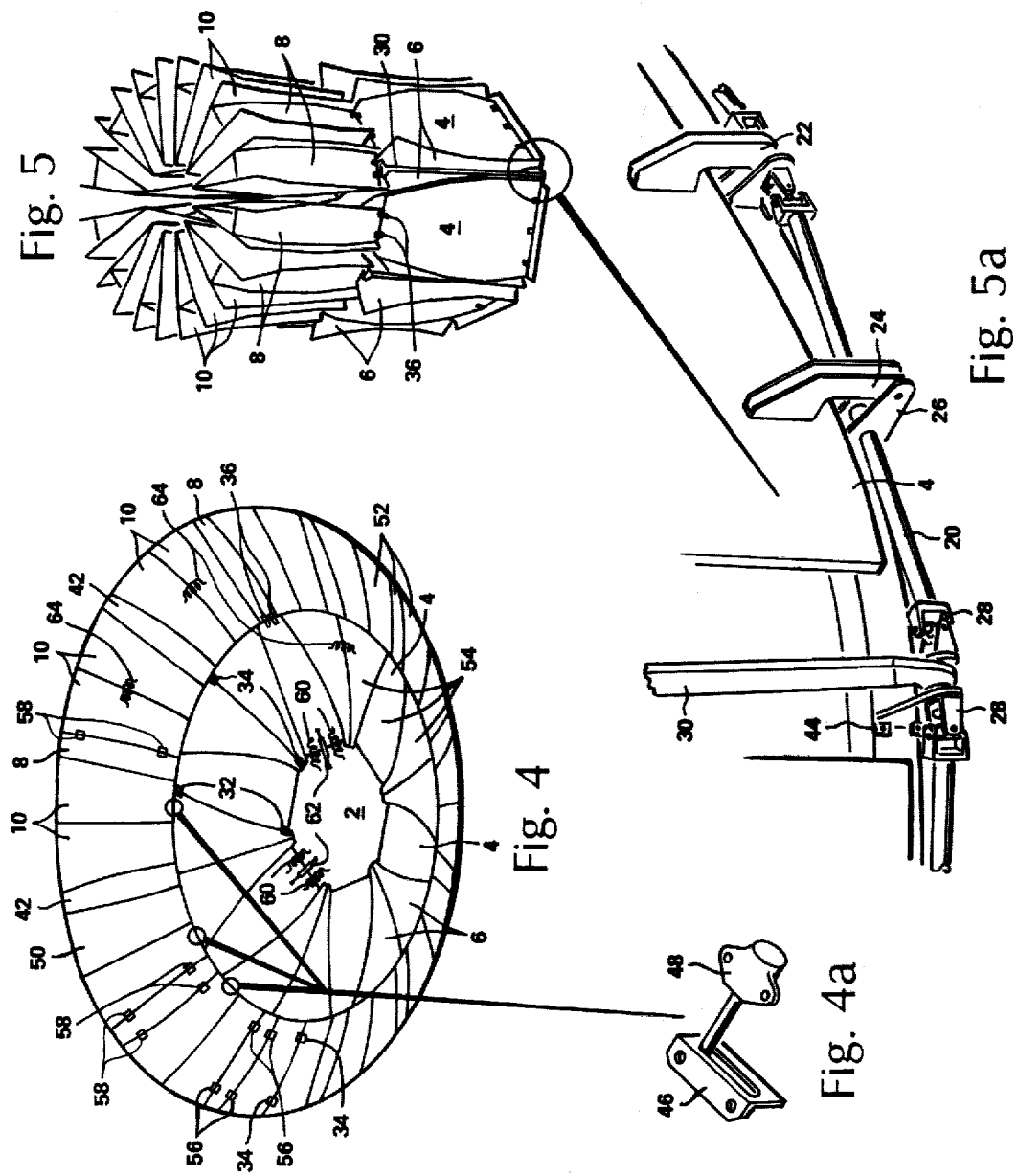

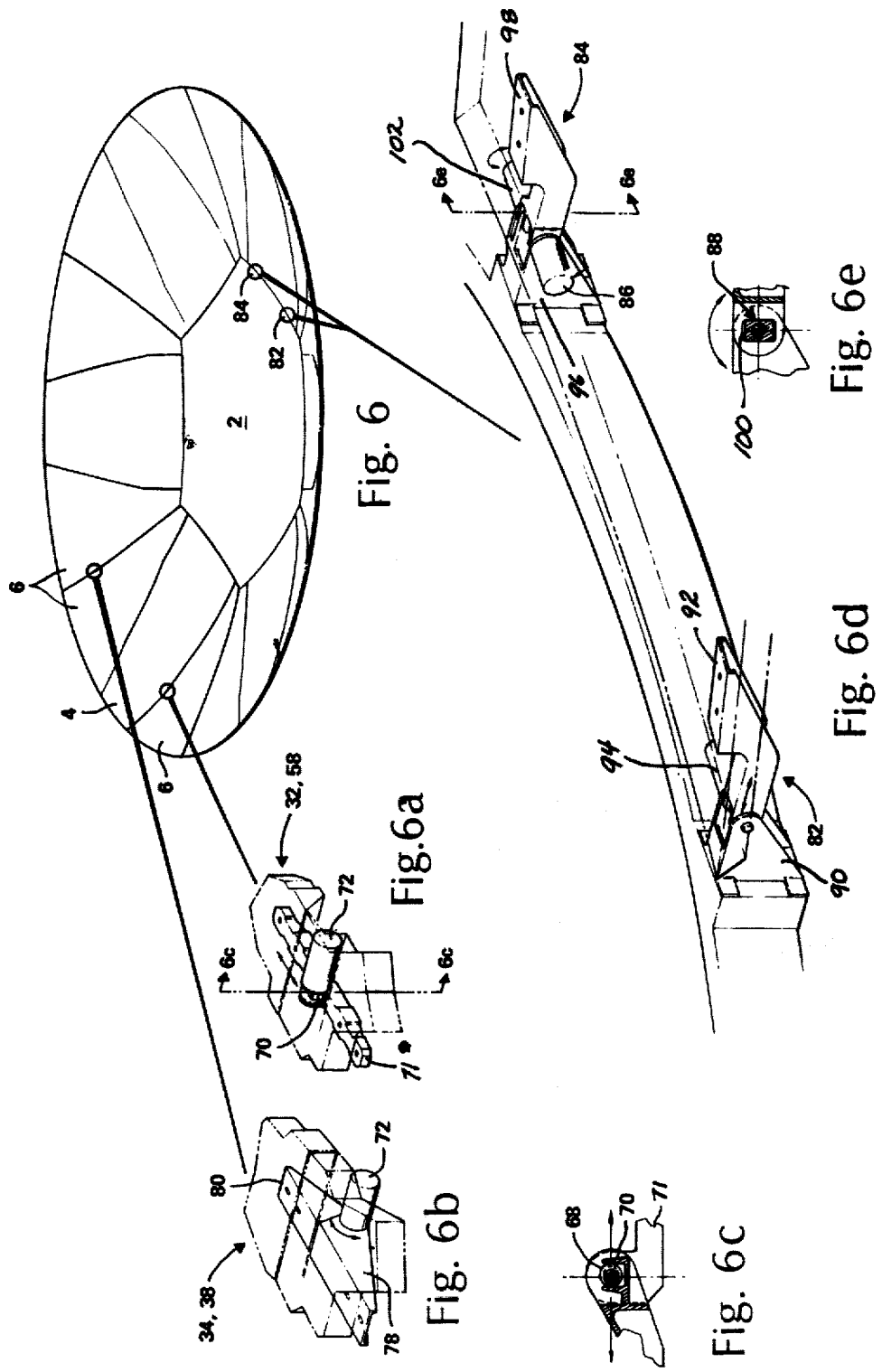

RIGID COLLAPSIBLE DISH STRUCTURE

This invention described herein was made in the performance of work under NASA Contract No. 955340 and is subject to the provisions of Section 305 of the National Aeronautics and Space Act of 1958 (72 Stat. 435; 42 U.S.C. 2457).

BACKGROUND OF THE INVENTION

1. Field of the Invention

This invention relates to collapsible dish structures of the type typically used for antennae and solar reflectors. Specifically, this invention is an improved method of constructing a collapsible dish structure which utilizes hinged, rigid petals. The dish when in its deployed configuration presents a solid, smooth surface which is suitable for the collection and focusing of extremely short wavelength electromagnetic radiation including light waves.

2. Prior Art

Collapsible dish structures are well known in the art and widely used for space applications where the antenna must be stowed during launch and deployed when the spacecraft is on station in space. Because of recent requirements for the use of shorter wavelengths in the electromagnetic spectrum, as well as an increased interest in the collection and focusing of light waves in space, collapsible dish structures for space application have been required to meet stringent requirements for surface smoothness and contour control in order to minimize scattering and improve antenna gain. These requirements have resulted in an increased dependence on antennae which utilize solid panels as contrasted to mesh collapsible antenna designs which are less suitable for short wavelengths.

Prior art in such solid deployable dish antenna designs as exemplified by U.S. Pat. No. 3,715,760 successfully solved the basic problem of constructing a rigid deployable dish. However, the art in its present state is unsuitable for antennae of large diameter compared to their stowed diameter, especially when such ratios exceed approximately 2.6:1. Furthermore, collapsible dish structures of this type are susceptible to warping due to thermal gradients, especially for antennas of advanced design with large surface to weight ratios such as the subject design.

SUMMARY OF THE INVENTION

This invention is an improved collapsible dish structure which comprises a plurality of concentric petal assemblies arranged around the axis of a dish in its deployed configuration. Means of controlling the deployment and varying the curvature of the deployed dish are also described.

The primary reason for the design of collapsible dish structures is to reduce the package size prior to deployment in order to minimize size of the payload during the launch phase of a satellite launch mission. Such a reduction in size has important benefits in aerodynamic drag and heating coefficient with the result that payload capability for a given launch vehicle is increased.

A primary goal of this invention was to improve the ratio of folded diameter to deployed diameter over the prior art. This was done in order to increase the diameter of dish which might be deployed from a container of limited dimensions, in this case the cargo bay of the space shuttle.

The prior art utilized a single row of petal assemblies arranged around a central support.

The use of more than one row of petal assemblies allows the ratio of deployed to collapsed diameter to be greater than that which can be achieved by a single row of petal assemblies (typically less than 2.6:1 for a single row configuration contrasted to ratios in excess of 3.4:1 for configurations with two rows or more of petal assemblies).

This effect is due to the fact that for a given diameter of dish, there is less curvature (and therefore less volume) for each petal of a multiple row dish than for a single row dish.

The inner row of petal assemblies consists of rigid center petals hinged to the center support at their inner edges and a pair of rigid mating side petals, one side petal on each side of the center petal. Each row of petal assemblies forms a closed circle concentric with the axis of the dish. Each petal is a rigid structure which forms a three dimensional compound curvature surface serving as a portion of the deployed dish. Each center petal extends radially from the center support, is hinged at its inner edge to the center support and is foldable inwardly from its deployed position. Each side petal is hinged at its mating edge to its corresponding center petal such that when the center petal is folded inwardly, the adjacent side petals rotate into a radial plane such that in the folded position they are disposed face to face on opposite sides of the adjacent center petal and are contained within a cylindrical envelope of greatly reduced diameter from the deployed dish.

Each outer row of petal assemblies has a similar configuration to that described above. The center petals of each row are hinged at their inner edges about an axis tangent to a circle concentric with the axis of the deployed dish.

In a configuration in which there are the same number of center petals in the outer row as the inner row, the hinge means for the outer row center petals is attached to the outer edge of the mating center petal of the inner row, the inner petals being directly hinged to the central support.

When there are more center petals in the outer row than in the inner row, independent hinge means connect the inner edges of the outer row center petals which do not mate to inner row center petals to the central support. In a like manner, configurations with more than two concentric rows of petal assemblies may be hinged so as to properly deploy into the desired dish configuration.

An alternate means of controlling the deployment of outer row non mating center petals is to provide a hinge means combined with a translation means between adjacent inner and outer row side petals to allow the required rotation and translation for deployment from the folded configuration to the deployed configuration.

While this invention was conceived specifically to construct a deployable dish describing a figure of revolution such as a parabola, it may be seen that surfaces which are not figures of revolution may be described by suitable variations in the hinge points of the petal assemblies which may result in variations and/or elimination of the configuration of the central support.

For the case in which a collapsible dish describing a figure of revolution such as a parabola is to be constructed, the hinge means for the center petals may comprise shafts rotatably mounted on journals attached to the center support and connected by couplings which will control deployment in a synchronized manner. This deployment may be assisted by motors, magnets or spring means connecting the center support and the hinge means, while the rate of deployment may be controlled by damping means connected between the hinge means and the center support.

Since this invention allows the deployment of larger antennae than previous designs and contains a greater number of panels, some method must be provided to control the shape of the dish when it is acted upon by thermal gradients. This control may be provided by eccentrics rotatably mounted within the hinge points between adjacent panels, thereby allowing adjustment of the pivot axis location between panels. Alternatively the hinge means for adjacent panels may be provided with translation means whereby the pivot axis may be shifted in the plane of each petal.

These shape control means would typically be controlled by remote sensing means which provide signals to adjust the antenna shape or according to signal patterns received from the antenna.

BRIEF DESCRIPTION OF THE DRAWINGS

FIG. 4 illustrates the construction for a dish configuration in which there are twice as many petal assemblies in the outer row as in the inner row.

FIG. 4a is an enlargement of the circled areas in FIG. 4 and illustrating hinge means connecting adjacent inner and outer row panels in FIG. 4;

FIG. 5 illustrates a modified collapsed dish similar to that of FIG. 4;

FIG. 5a is an enlargement of the circled area in FIG. 5 and illustrating an independent hinge means for the outer ring center petals which do not mate with inner ring center petals;

FIG. 6 illustrates a modified dish embodying shape control mechanisms for the deployed dish structure;

FIGS. 6a, 6b and 6c are enlargements of the circled areas, respectively, in FIG. 6 and illustrating adjustable hinge means embodied in the dish structure;

FIG. 6d is a section taken on line 6d—6d in FIG. 6a; and

FIG. 6e is a section taken on line 6e—6e in FIG. 6d.

DESCRIPTION OF THE PREFERRED EMBODIMENTS

This invention is of an improved collapsible dish structure. While there are numerous surface configurations that a collapsible dish as described herein may form, the preferred embodiments illustrated are of a parabolic dish structure, as it is illustrative of the alternate methods of configuring the invention and is of broad application in the art.

Figure 1:
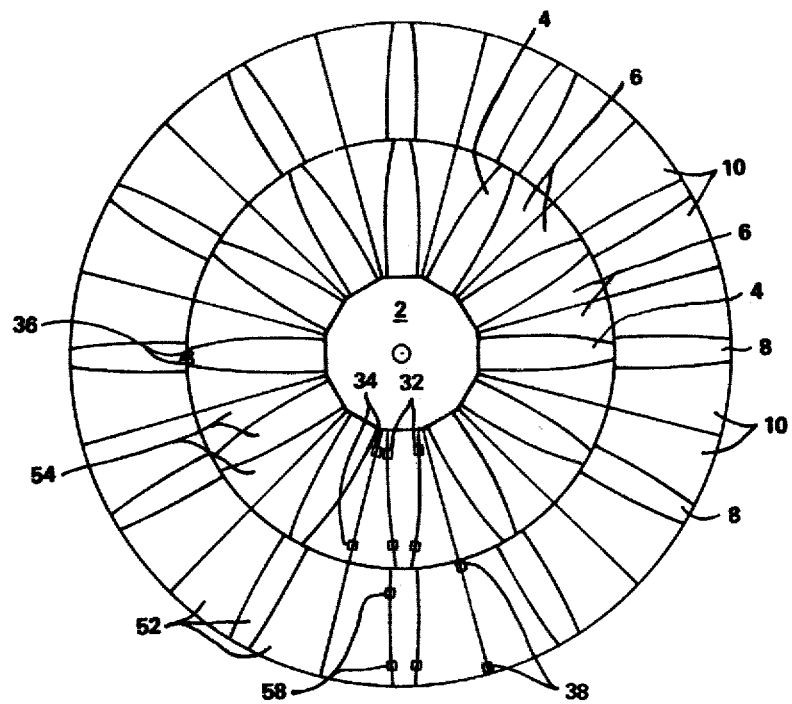
FIG. 1 is a plan view of the deployed dish structure.
Figure 2:
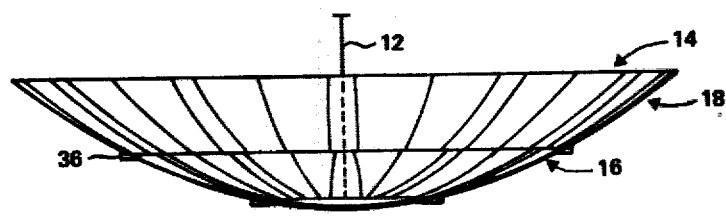
FIG. 2 is an elevation of the deployed dish structure.
Figure 3:
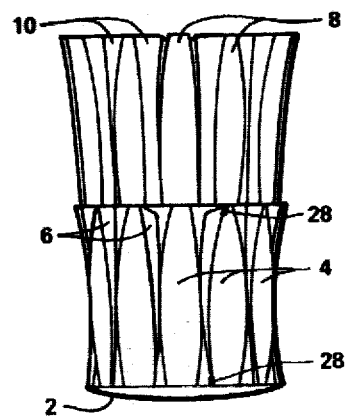
FIG. 3 is an elevation of the dish structure in its stowed configuration.

The collapsible dish structure 14 shown in FIGS. 1-3 is formed around a symmetrical center support structure, 2 which in this illustration contains a portion of the surface of the dish. Arranged about the center support are a plurality of concentric rows 16, 18 of petal assemblies 52, 54 (two rows illustrated) which, with the center support 2, form the surface of the dish and are composed of rigid radial petal assemblies 16 which form the surface of the deployed dish. Each petal assembly consists of a rigid center petal 4, 8 and a pair of mating side petals 6, 10. The petal assemblies of each row are similar in form consistent with the geometry of the dish to be formed. In the preferred form each petal forms a concave-convex portion of the dish corresponding with the area of the dish that it occupies. It is constructed of a light but strong material such as carbon filament or honeycomb and is fitted with an electrically conductive surface to act as a reflecting medium for the electromagnetic waves. Alternatively, if the dish were to be used as a solar collector, the active surface of the dish, in this case the concave portion, would be reflective to the light frequencies of interest.

At the inner edges of the inner row center petals 4 are hinge shafts 20 to which the petals are rigidly attached by plates 22. Hinge shafts 20 are rotatably supported in bearing brackets 26 attached rigidly to and spaced circumferentially about the center support 2. The inner row center petals have arms 24 hinged to the brackets 26. Hinge shafts 20 and arms 24 pivotally support the center petals 4 on the center support 2 to allow folding and unfolding of the center petals about the hinge axes tangent to a circle centered on the axis of the dish.

Each inner row side petal 6 is joined along the mating edge with the center petal 4 by hinges 32 adjacent to the radial inner and outer ends of these edges. Hinges 32 are secured to the outer surfaces of the petals, and each pair of hinges have a common hinge axis connecting the mating edges of the center and side petals. Each pair of adjacent side petals 6 are hinged in a like manner along their mating edges on an axis joining the mating inner and outer edges by hinges 34 in a radial direction from the center support. For the sake of clarity, only a few of the petal hinges have been shown. This also applies to the other drawing figures.

The outer row of petal assemblies may consist of either the same number of petal assemblies as the inner row as illustrated in FIGS. 1-3 or may contain more petal assemblies as illustrated in FIGS. 4 and 5. In the latter case, twice the number of petal assemblies is shown in the outer row as are shown in the inner row. The advantages to having a greater number of petal assemblies in the outer row than in the inner row is that since the side petals are of smaller chord in the row of petal assemblies when the number of petal assemblies is increased, there is less curvature to each petal, thereby allowing the folded diameter to be smaller as can be seen from FIGS. 4 and 5.

In the case in which equal numbers of petal assemblies are contained in the inner and outer rows, FIGS. 1-3, the radially aligned center petals of the inner and outer rows are attached by hinge means 36 on axes tangent to the circle which is at the mating surface between the inner and outer rows. The adjacent side petals of each outer row petal assembly 52 are connected by hinge means 58 on their mating edges to the center petal 8 in a manner similar to the inner row side petals. Mating side petals are hinged to one another at their longitudinal axes by hinge means 38 on an axis which connects the inner and outer mating edges in a manner similar to that used for the hinging of the inner row of petal assemblies 54.

One advantage to a dish configuration which has equal numbers of petals in each row as described above is that the hinge point for each succeeding row of center petals may be the preceding row center petal outer edge.

The configuration of the dish which has two times the number of petals in the outer ring as the inner ring, FIGS. 4 and 5, while allowing a superior ratio of collapsed to deployed diameters compared to the configuration with equal numbers of petals in each row, requires an additional hinge means for the outer row 18 of petal assemblies. In FIGS. 5, 5a, the center petals of the outer row which mate with center petals of the inner row are connected by hinge means 36 at their mating edges. The intermediate center petals 42 are connected to independent hinge arms 30 which attach to the hinge shafts 20 and are rotatably mounted on journals 44 on the center support 2 so as to assure proper deployment geometry.

In order to assure synchronous deployment of the dish petals, the hinge shafts 20 are connected by suitable couplings 28 so as to assure constant relationships between the petals during deployment.

As shown in FIGS. 4 and 4a, an alternative method of effecting deployment of each outer row petal assembly which does not mate with an inner row center petal is to provide, instead of the independent hinge arms 30, a pin and slot connection 46, 48 mounted between adjacent inner and outer row side petals at their mating edges to effect folding of the odd petal assemblies as the mating center petals are folded. In this embodiment, the pin 48 is mounted on an inner side petal 6 while the slot assembly 46 is mounted on the mating outer side petal 10. By suitable design of the slot in 46, side petal 10 may translate and rotate while side petal 6 is folded with its mating center petal 4, thereby folding the adjacent side petal 50 and the odd center petal 42.

Petal assemblies 52, 54 are foldable inwardly from the deployed positions of FIG. 4 to collapsed positions similar to FIG. 5. In the collapsed configuration, the center petals 4, 8, 42 are roughly parallel to the axis of the dish and lie against a center post 12. The adjacent side petals 6, 10, 50 rotate about the hinge means 32, 56, 58 and are folded into positions roughly perpendicular to their mating center petals and with their inside faces adjacent to the center petal. The collapsed dish structure is contained within a cylindrical envelope of substantially smaller diameter than the deployed dish. The dish may be deployed by the force of springs 60, 64 connected as shown between the support 2 and the inner row center petals 4 and between the adjacent side petals 6 and 10. Alternatively, deployment may be accomplished by rotating the pivot shafts 20 of the inner row petal assemblies so as to rotate the petals outwardly, thereby forming a rigid dish structure 14. The driving force applied to the shafts may be via geared motors. Dampers 62 may be used to control the rate of deployment and prevent nonsynchronous deployment.

Once deployed, the dish 14 may be subjected to temperature gradients due to heating from thermal sources in space, thereby destroying the symmetry of the dish and reducing its effectiveness as an antenna. FIGS. 6-6e illustrate a means to control the shape of the deployed antenna by remote means. In this embodiment, the hinge means 32, 58 between adjacent side and center petals 4, 6 comprise hinge members 70, 71 fixed to the petals, respectively, and pivotally joined by an eccentric or hinge pin. This hinge pin is rotatably adjustable by a torque motor mounted to one member and about an axis eccentric to the hinge axis to laterally translate the hinge axis in the direction of the arrow in FIG. 6a. The hinge means 34, 38 between adjacent side petals 6 comprise hinge members 78, 80 fixed to the petals, respectively, and a torque motor 72 mounted on one member for driving these hinge members in their hinging motion.

The radially inner end of each center petal 4 is connected to the center support 2 by a pair of hinge means 82, 84. Hinge means 82 are similar to the adjustable hinge means 32, 58 just described and comprise hinge members 90, 92 fixed to the center support and center petal, respectively, and pivotally joined by an eccentric hinge pin which is rotatably adjustable by a torque motor 94 on one hinge member to translate the hinge axis in the direction of the horizontal left-hand arrow in FIG. 6d. Hinge means 84 are similar to hinge means 82 in that hinge means 84 have hinge members 96, 98 fixed to the center support 2 and center petal 4, respectively, and pivotally joined by an eccentric hinge pin which is rotatably adjustable by a torque motor 86 on one hinge member. In this case rotatable adjustment of the hinge pin translates the hinge axis in the direction of the vertical right-hand arrow in FIG. 6d.

Hinge means 84 also embodies a rectangular key 88 which fits slidably within a slot 100 in hinge member 98 and is rotatable by a torque motor 102 on hinge member 96 about an axis parallel to and approximately coincident with the hinge axis. Rotation of the key 88 by its torque motor 102 applies a torque to the center petal 4. The key is slidable in its slot 100 to accommodate the above-described adjustment of hinge means 84 in the direction of the right-hand vertical arrow in FIG. 6d.

The several torque motors 72, 86, 94, 102 of the dish in FIG. 6 may comprise geared stepper motors and are adapted to be selectively controlled to adjust the dish shape by selective adjustment of the hinge means 34, 38, 32, 58, 82, 84 embodying the motors. Following is a summary of the dish adjustment functions which are effected by adjustment of the various hinge means.

| Hinge Means | |
|---|---|
| 34, 38 | Provides rotary motion to correct for petal twist - also provides deployment torque and rate control |
| 32, 58 | Provides linear motion to compensate for changes in petal width and maintain correct focal length |
| 82 | Provides linear motion to compensate for relative displacement of inboard hinges |
| 84 | Moves panel to compensate for petal twist and applies moment to petal to compensate for petal curvature due to temperature gradients. |

In practice, the hinge adjustment motors may be driven by signals from a remote sensing means which monitors the shape of dish and corrects the hinges accordingly.

We claim:
1. An improved collapsible dish structure comprising:
   a rigid symmetrical center support;
   a plurality of concentric rows of petal assemblies arranged around said central support, including an inner row of petal assemblies and at least one outer row of petal assemblies;
   each petal assembly containing a rigid center petal and two rigid side petals;
   a first hinge means pivotally joining the center and side petals on hinge axes along the adjacent petal edges;
   a second hinge means pivotally connecting said center petals to said support on pivot axes tangent to concentric circles about the axis of said support;

a third hinge means pivotally joining the adjacent side petals of adjacent petal assemblies on pivotal axes along the adjacent longitudinal edges of the adjacent said petals;

said petals being deployable outwardly about their hinge axes to deployed positions;

said petals being rotatable inwardly about their hinge axes from said deployed positions to folded positions wherein the adjacent side petals extend inwardly from and in transverse relation to their respective center petals and in face to face relation to one another and the petals are contained within a cylindrical envelope having a ratio of diameter deployed to diameter collapsed of 3.4 or better.

2. A collapsible dish structure according to claim 1 wherein the petals have a compound curvature such that in the deployed position the petals conform to a common surface of revolution generated about the dish axis so as to form a concave-convex dish of given diameter.

3. A collapsible dish structure according to claim 1 including deployment means for unfolding said petals from their folded position to their deployed position.

4. A collapsible dish structure according to claim 2 wherein said deployment means comprise means connected to said center petals.

5. A collapsible dish structure according to claim 1 including folding means for collapsing said deployed dish to the folded position.

6. A collapsible dish structure according to claim 5 wherein said folding means comprise means connected to said side petal assemblies.

7. A collapsible dish structure according to claim 1 wherein the outer rows of said petal assemblies contain a greater number of petal assemblies than the next inner row; and hinge means connecting said outer row and inner row center petals to said center support.

8. A collapsible dish structure according to claim 1 wherein said second hinge means joining the center petals to said support comprise pivot shafts rotatably mounted on said support and joined to said center petals, and coupling means joining the adjacent pivot shafts for deployment of said petals in unison.

9. A collapsible dish structure according to claim 3 wherein said deployment means comprise springs connected between said support and certain center petals.

10. A collapsible dish structure according to claim 1 which further comprises:

means connected between said center support and said petal assemblies to control the rate of deployment.

11. A collapsible dish structure according to claim 1 wherein said surface of revolution is a parabolic surface.

12. A collapsible dish structure according to claim 1 wherein said support comprises a post extending along the central axis of said support.

13. A collapsible dish structure according to claim 1 including means attached to hinge means, said means providing translational and rotational adjustment of said hinge means to effect alternation of dish contour.

* * * * *